United States Patent [19]

Yetka

[11] Patent Number: 5,763,024
[45] Date of Patent: Jun. 9, 1998

[54] TRIM COMPONENT INCLUDING A METALIZED POLYESTER FILM AND SUBSTRATE HAVING CURLED EDGES

[75] Inventor: Charles E. Yetka, Scotch Plains, N.J.

[73] Assignee: Transfer Print Foils, Inc., East Brunswick, N.J.

[21] Appl. No.: 395,765

[22] Filed: Feb. 28, 1995

[51] Int. Cl.$^6$ .................................................. B60R 13/00
[52] U.S. Cl. ................... 428/31; 428/192; 428/412; 428/458; 428/460; 428/522; 428/523; 427/299; 427/322; 427/532; 427/534
[58] Field of Search ................... 428/458, 31, 460, 428/192, 412, 522, 523; 204/192.15, 192.26, 192.27; 427/532, 534, 299, 322, 250, 248.1

[56] References Cited

U.S. PATENT DOCUMENTS

| | | | |
|---|---|---|---|
| 4,115,619 | 9/1978 | Kurfman et al. | 428/336 |
| 4,275,099 | 6/1981 | Dani | 428/31 |
| 4,403,004 | 9/1983 | Parker et al. | 428/31 |
| 4,497,678 | 2/1985 | Nussbaum | 156/244.11 |
| 5,011,705 | 4/1991 | Tanaka | 427/39 |
| 5,372,685 | 12/1994 | Anschel | 204/192.14 |

*Primary Examiner*—Stevan A. Resan
*Attorney, Agent, or Firm*—Plevy & Associates

[57] ABSTRACT

A metalized polyester film for application to a substrate to be used as a trim component for automobiles and the like. The film is comprised of a thermally stable extensible polyester carrier for supporting multiple layers of metallic and thermoplastic coatings. Prior to application of a metallic coating, the film is cleaned by means of exposure to an inert gas such as argon in order to remove moisture and other impurities. A layer of aluminum or other metal is then deposited on the carrier film thereby forming a superior bond with the cleaned surface. A tie coat primer is applied over the aluminum which is followed by an adhesive. The metalized film is adhesively applied to a formable substrate which is configured into an end component part by means of vacuum forming or pressure forming. The formed laminated substrate is next attached to a piece of support plastic, wherein the composite part can be applied as trim. A protective lacquer coat is applied to the polyester film as a final step. The end product trim component is extremely wear-resistant and the polyester film is suitable for embossing. In an alternate embodiment of the invention, lamination to the formable substrate is eliminated from the process and the metalized film is applied directly to an extruded plastic member configured to the shape of the end product.

25 Claims, 6 Drawing Sheets

TRIM COMPONENT INCLUDING A METALIZED POLYESTER FILM AND SUBSTRATE HAVING CURLED EDGES

FIELD OF THE INVENTION

The present invention relates generally to metalized laminates and more specifically to laminates useful in the automobile industry.

BACKGROUND OF THE INVENTION

In order to accentuate the appearance of automobiles, water crafts and other like products, such products are often equipped with stylistic trim which is added on to a basic model. The trim which many times, in the case of automobiles, gives the appearance of being chrome, silver, or even gold plated, enhances the appearance of the vehicle, and as such may make the product more appealing to the would-be consumer. In the past, these trim components were made from metal and then plated with a reflective coating, for example, chrome. Manufacture of these components proved to be prohibitively costly while at the same time adding additional unwanted weight to the vehicle. This added weight was disadvantageous especially in light of the movement toward more fuel efficient vehicles.

In order to produce less expensive and more lightweight trim components, an initial solution was to manufacture the parts from a plastic material and to then coat these parts with a metalized laminate. The laminate gave the impression of chrome plating, however, these laminated parts did not wear well and were very susceptible to the elements and shortly exhibited signs of cracking and corrosion. Moreover, any chipping or scoring to the laminated part would greatly accelerate the corrosion or pitting associated with the exposed surface. In addition, the laminated parts would rapidly experience discoloration and exhibit a cloudy or smokey finish.

Another disadvantage to these laminated trim components is that they were not suitable for embossing or other printing procedures. Since the parts were not adapted for embossing and the like, other decorative techniques desirable to the consumer and manufacture could not be practiced.

It is therefore an object of the present invention to provide an improved high quality laminate which is wear-resistant and meets automobile manufacturer's specifications for thermal-cycling and weather resistance. It is also an objective of the present invention to provide a formable trim component that is inexpensive to produce. It is further an object of the present invention to provide a metalized laminate that is suitable for embossing and other decorative techniques.

SUMMARY OF THE INVENTION

The present invention is a metalized polyester film for application to a substrate to be used as a trim component for automobiles and the like. The film is comprised of a thermally stable extensible polyester carrier for supporting multiple layers of metallic and thermoplastic coatings. Prior to application of a metallic coating, the film is cleaned by means of exposure to an inert gas such as argon in order to remove moisture and other impurities. A layer of aluminum or other metal is then deposited on the carrier film thereby forming a superior bond with the cleaned surface. A tie coat primer is applied over the aluminum which is followed by an adhesive. The metalized film is adhesively applied to a formable substrate which is configured into an end component part by means of vacuum forming or pressure forming. The formed laminated substrate is next attached to a piece of support plastic, wherein the composite part can be applied as trim. A protective lacquer coat is applied to the polyester film as a final step. The end product trim component is extremely wear-resistant and the polyester film is suitable for embossing.

In an alternate embodiment of the invention, lamination to the formable substrate is eliminated from the process and the metalized film is applied directly to an extruded plastic member configured to the shape of the end product.

BRIEF DESCRIPTION OF THE FIGURES

For a better understanding of the present invention, reference may be had to the following description of an exemplary embodiment thereof, considered in conjunction with the accompanying drawings, in which.

DETAILED DESCRIPTION OF THE DRAWINGS

Figure 1:
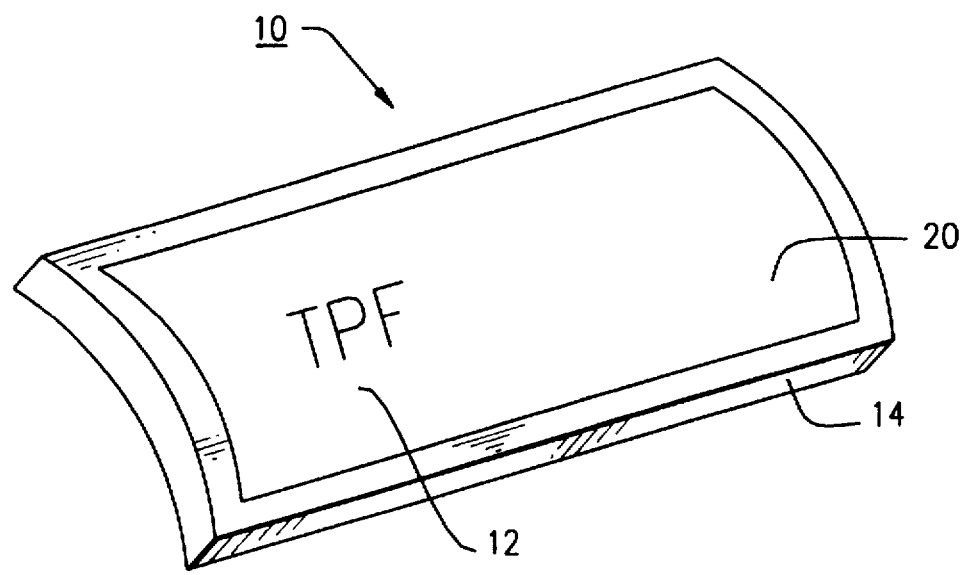
FIG. 1 is a perspective view of an automobile trim component employing the present invention laminate.

Referring to FIG. 1 there is shown a decorative trim piece 10 for use on an automobile or other like product, the trim component being manufactured in accordance with the present invention. The trim piece 10 may be applied to automobiles, boats, etc. as molding, trim or any other part requiring the appearance of a metalized finish. The trim piece 10 includes a laminated film 20 which is adhered to a substrate 14. The trim 10 includes an embossed marking 12.

Figure 2:
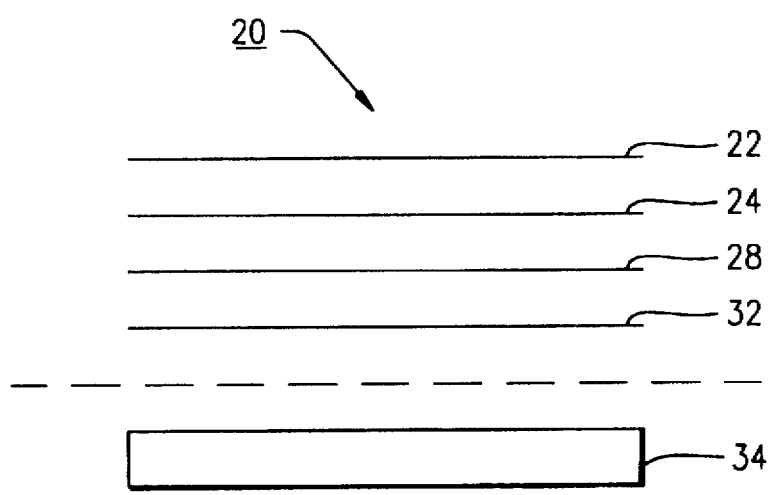
FIG. 2 shows a cross-sectional view of the present invention extensible polyester film laminate.

Referring to FIG. 2, there is shown a cross section of one preferred embodiment of the present invention laminated film 20. As can be seen, the film is comprised of multiple layers of coatings which are applied during various stages of the manufacturing process. A first layer is a carrier 22 to which all the other layers of coatings are applied. The carrier 22 may be a polyester or other thermally stable film to which metallic, thermoplastic or other like coatings are advantageously applied. In the preferred embodiment of the invention, the carrier is an extensible polyester of the type manufactured by ICI, Inc. of Hopewell, Va., under the trade name of Melenix films, P/N 3356/92. The extensible polyester film of the type described is substantially more flexible, pliable and thermally sensitive than traditional polyester films. The extensible polyester films suitable for use with the present invention range between 0.48 and 2 mils, with a preferred embodiment of the invention utilizing a 92 gauge clear extensible polyester film.

Prior to the application of any coatings, the carrier 22 will be cleaned by exposure of an inert gas, such as argon gas, in order to remove any moisture or microscopic residue that has become attached to the carrier. In this way an improved bond between the carrier 22 and other coatings will be realized. In the preferred embodiment of the invention an aluminum coating 24 is deposited on the carrier by means of sputter deposition or other known method. A super bond between the recently cleaned extensible polyester film carrier 22 and the aluminum 24 is thus created. The aluminum coating will be uniformly applied to the carrier at a thickness measured by electrical resistance in the range of between 10 and 30 ohms. It will be understood that the aluminum coating 24 will take on a bright silver finish closely resembling that of chrome, or that the aluminum or other deposited metal may be colorized to represent a gold metallic finish or any other color.

A primer coat or tie coat 28 will be applied over the aluminum coating 24 in order to increase interfacial adhesion. The tie coat may consist of any chemical composition which aids in the interfacial adhesion, for example, a urethane mixture. Application of the tie coat 28 will be performed via coating, casting, laminating or other known method, depending on the desired thickness of the layer. As is known in the art, coatings may be applied by means of gravure or Reverse roller, Mayer bar, coextrusion or lamination which are generally used to apply thicker films and coatings.

The film 20 will then have applied to it an adhesive coating 32, such as a vinyl adhesive, which is adhesively activated upon reaching a predetermined temperature. The aluminized polyester transfer film 20 will then be transferred onto a substrate 34 which will be used in forming the final part. The substrate 34 will be made from ABS (acrylic butyl styrene), PVC (polyvinyl chloride), styrene, polycarbonate, TPO, or any other formable substrate. The substrate 34 will range in thickness between 10 and 40 gauge.

Figure 3:
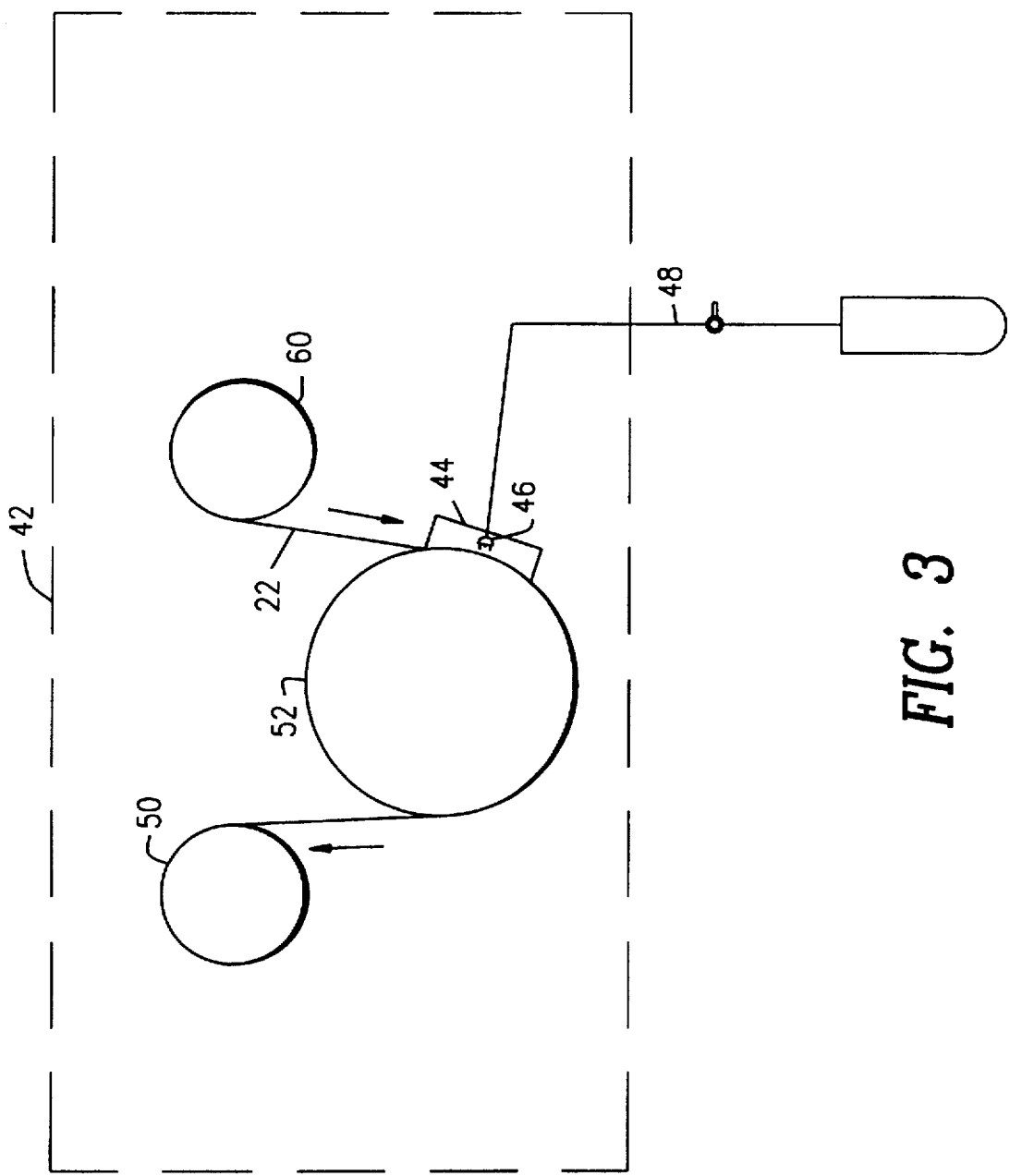
FIG. 3 shows one preferred embodiment for manufacture of the present invention metallic film laminate.

Referring to FIG. 3, there is shown one preferred embodiment for manufacture of the present invention transfer film 20, and specifically application of the aluminum coating 24. A sputter deposition or vapor deposition set-up 40 is included within a vacuum chamber 42 having a vacuum of approximately $10^{-4}$ Torr. As is known in the art, a uniform coating of material can be applied to a surface by bombarding a target with ions in order that the target will emit sputtered atoms, which are in this case aluminum. Other suitable methods of metal deposition may also be utilized.

A secondary chamber 44 is included within the vacuum chamber 42, wherein there is contained an outlet 46 for dispersing an inert gas such as argon. The flow of argon gas is regulated by means of a valve 48 or other known control mechanism. A feed roll 60 of the extensible polyester carrier 22 is included within the vacuum chamber 44 and the carrier 22 is passed through the secondary chamber 44 where it is subjected to a spray of the argon gas. The exposure of the polyester film 22 to the argon gas acts to clean the carrier 22 and remove any moisture, residue, particulates or other impurities which have become attracted to the carrier. Tests have shown application of the argon gas to be a far superior cleaning agent for the polyester film than any that had been employed in the prior art. Cleaning of the exposed carrier produces a surface having improved bonding capabilities with that of the deposited aluminum 24, wherein essentially a super bond can be created between the carrier and the metal. The carrier is drawn by means of a take-up roll 50 while at the same time interacting with intermediate roller 52.

After the carrier 22 is cleaned in the secondary chamber 44 and advanced onto the intermediate roller 52 the carrier 22 will be sputter deposited with aluminum as shown by the figure. A thin coating of aluminum on the order of 10–30 Ohms will be super bonded to the carrier as discussed. Once the roll of carrier film 22 is completely advanced through the system and deposited with aluminum, the take-up roll will be removed from the vacuum chamber 42 wherein other coatings will be deposited in a known manner. It will be understood that the take-up 50 and feed rolls 60 need not necessarily be present within the vacuum chamber 42 itself and that the carrier 22 need only be fed into the chamber in order to be cleaned and metalized. As discussed previously, after the carrier is metalized it will be treated with a tie coat 28 and adhesive coat 32 and applied to a substrate 34.

Figure 4:
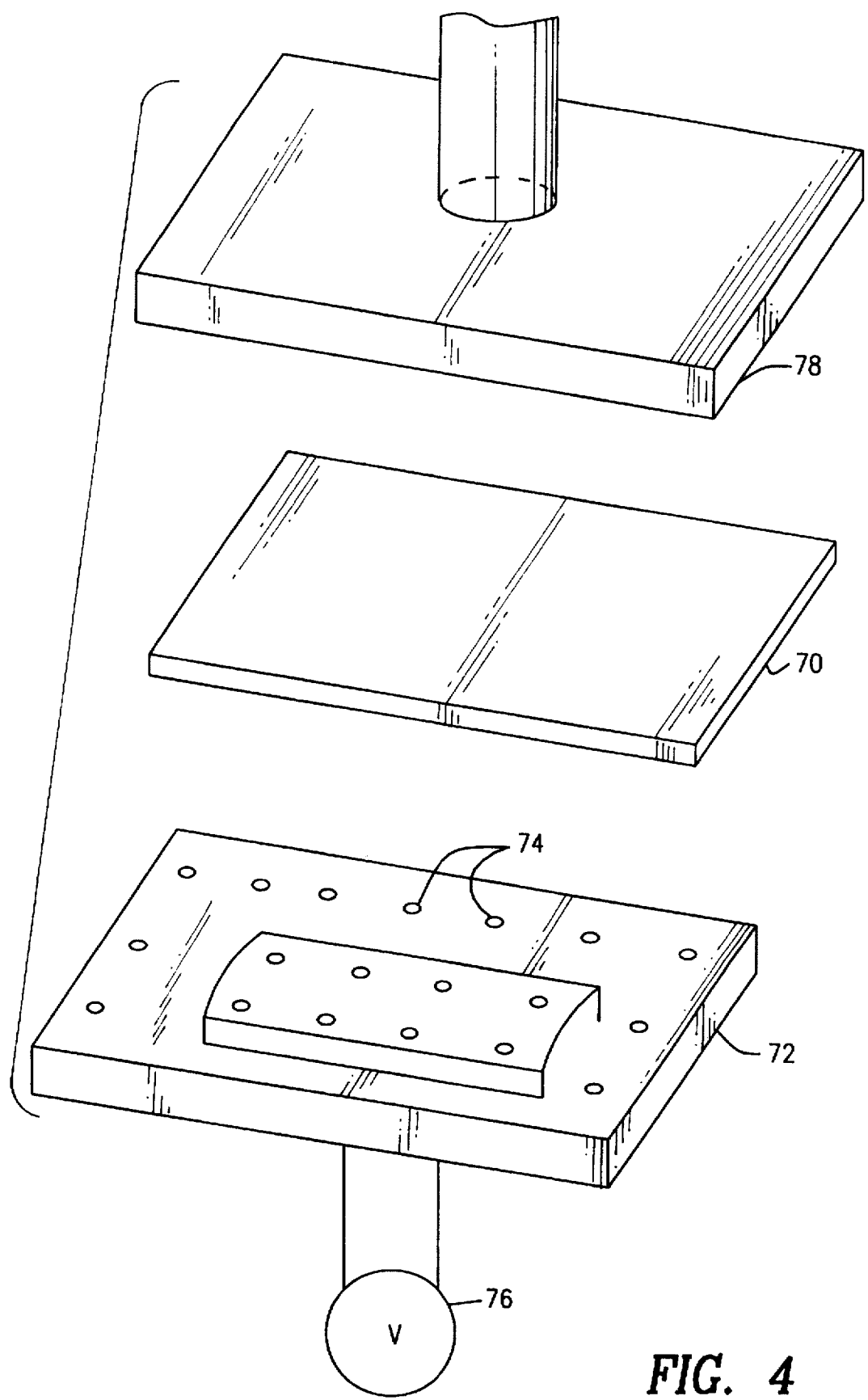
FIG. 4 shows another portion of the manufacturing process for the present invention laminate.

Once the transfer film 20 has been applied to the substrate 34, the resulting laminated substrate is ready for forming into the final product. In a preferred embodiment of the invention, the forming of the final product may take place by means of vacuum forming or pressure forming. FIG. 4 illustrates the process of vacuum forming and shows a mold 72 having multiple perforations 74 therein. The base of the mold 72 is coupled to a vacuum 76. Prior to being formed the laminated substrate 70 is heated to increase the pliability of the substrate 70 and make the component ready for vacuum forming. Once the substrate 70 is heated the substrate 70 will be transferred within the mold 72. It will be understood that the heating may or may not take place in the mold itself.

A cover portion 78 of the mold will be lowered over the heated substrate and onto the base portion of the mold 72. The vacuum will then be activated and the substrate will be pulled over the mold by means of the vacuum streams entering each of the perforations 74 in the mold. Shortly after activating the vacuum, the laminated substrate 70 will be formed into the shape of the mold.

As discussed the forming process may also be accomplished by means of pressure forming or any other suitable method for forming of a substrate 34. In the case of pressure forming, top and bottom portions of the mold are heated to a temperature that will allow the substrate to be shaped. The substrate 34 may also be heated prior to placement in the mold. The top and bottom portions of the mold are then drawn together with the substrate interposed between the two heated plates. A desired shape of the component will then be formed by means of the pressure exerted on the substrate.

Figure 5:
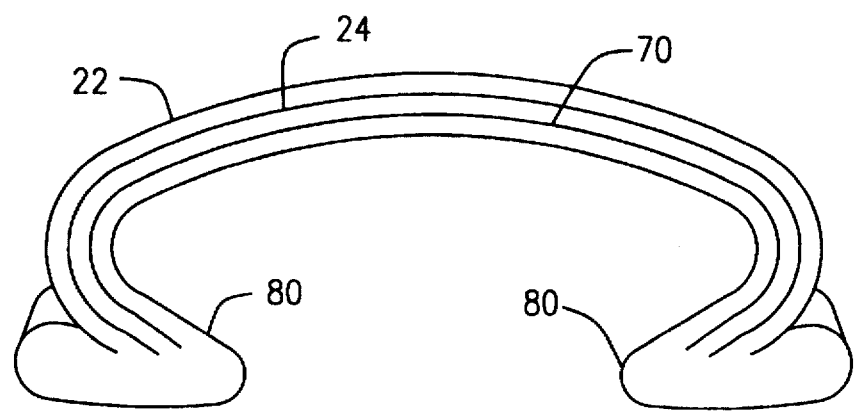
FIG. 5 shows a cross-sectional view of the end product trim component manufactured according to the present invention.

After the laminated substrate 70 has been formed into a desired shape for the final component, the formed component will be attached into a backing of support plastic as shown in FIG. 5, in order that the final trim component 10 may be utilized on an automobile or other like product. The support plastic 80, as will be discussed, seals around the polyester carrier film 22 such that the metal coating 24 underneath the carrier will remain fully protected. In a preferred embodiment of the invention, the laminated substrate 70 is attached to the support plastic by injection molding. The formed laminated substrate 70 is placed within an injection mold and the molten support plastic will be injected therein. During the forming process for the laminated substrate 70, the edges of the substrate 70 are slightly curled under so as to create a curved bend at the outer periphery of the substrate. Accordingly, once the injected plastic is flowed into the mold and the edges of the substrate 70 are tucked into the support plastic 80 to form a wear resistant and weather resistant seal. In this way, the coatings underneath the carrier film 22 are protected from exposure. The thickness of the support plastic will vary depending on the ultimate application for the component 10.

The exposed polyester portion of the trim component 10 will be treated with a UV protective coating in order to protect the component from sun and other exposure. The protective coating which will be in the form of a lacquer will also protect the metallic finish form smoking or hazing over time. Prior to application of the protective lacquer coating the trim component may be embossed in a known manner with any wording or graphics such as company or brand name desired to be carried on the final product. It will also be understood, however, that any embossing may take place prior to lamination of the film 20 to the substrate and while the film is easily manipulated on rolls.

The present invention trim component is advantageous in that it is extremely durable and wear resistant while at the same time maintaining a high degree of flexibility. The component can be stretched and flexed with no sign of hazing or cracking due to bending. Additionally, if the product were to be scored with a razor the film attached to the substrate will not de-laminate, nor will the metallic finish degrade. Tests have shown that subsequent to scoring by a razor, the laminated trim component will still pass standard thermal cycling tests used by most auto manufacturers.

Figure 6:
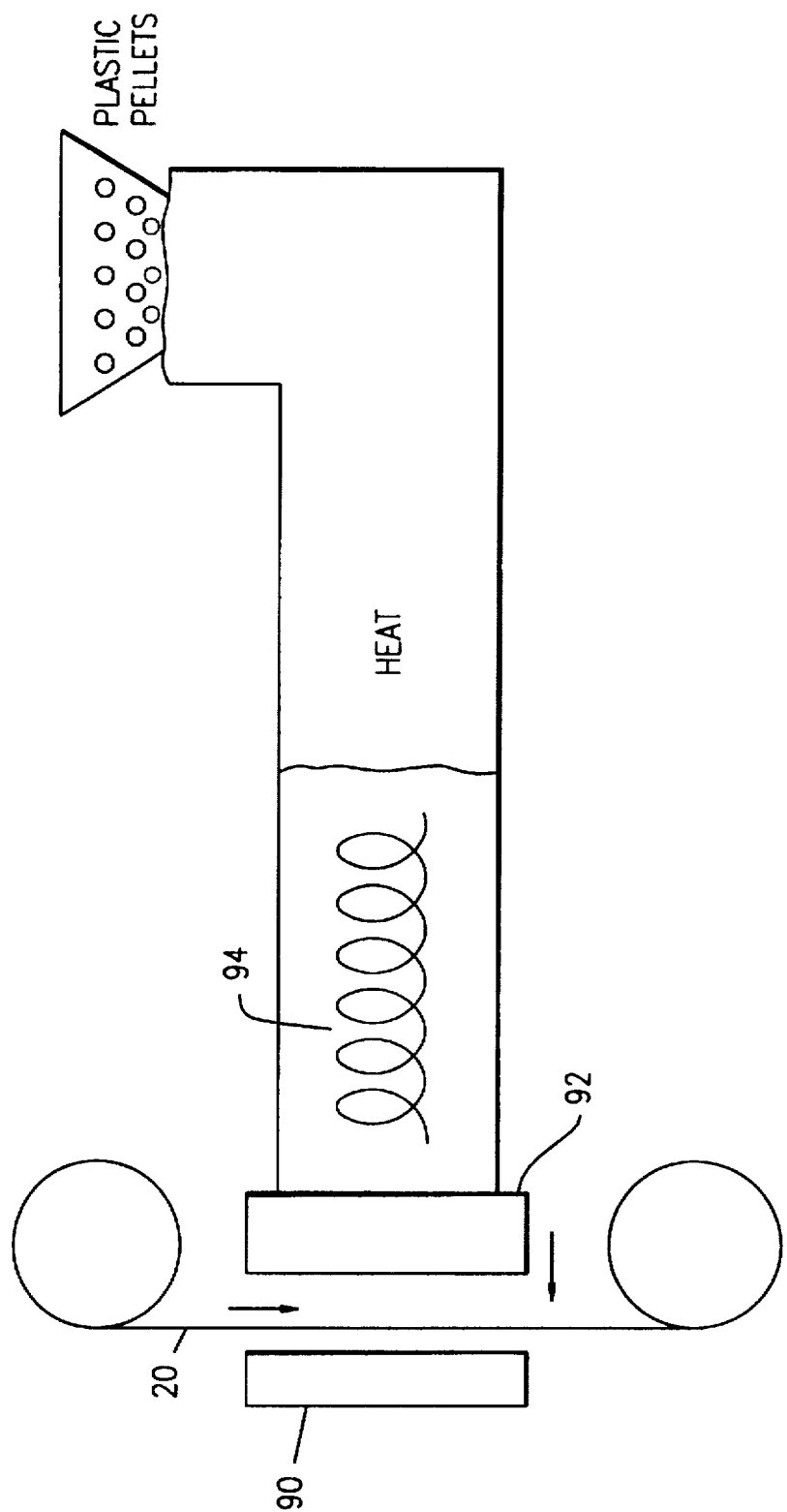
FIG. 6 is a second preferred embodiment for manufacture of the present invention laminate.

In an alternate embodiment and method of making the present invention, the formable substrate is eliminated from the manufacturing process. Referring to FIG. 6, there is shown a process for directly feeding the metalized extensible polyester film 20 into an injection mold system. A portion of adhesively treated metalized film 20 is advanced between male 90 and female 92 injection mold plates. The mold plates 90,92 contain the shape and configuration of the final trim component to be formed. Once the roll of film 20 is advanced in between the injection mold the plates are closed together sealing the metalized film 20 inside. The support plastic 94 is then extruded into the mold wherein the film is adhesively attached directly to the plastic 94. This process has the advantage of reducing the number steps required in the process and eliminating the need for the foil 20 to be laminated initially to the ABS or PVC substrate. Advance knowledge of the final configuration for the trim component is required to implement this process.

From the above, it should be understood that the embodiment described, in regard to the drawings, is merely exemplary and that a person skilled in the art may make variations and modifications to the shown embodiment without departing from the spirit and scope of the invention. All such variations and modifications are intended to be included within the scope of the invention as defined in the appended claims.

What is claimed is:

1. A trim component comprising a substrate, a laminate, and a support plastic, wherein
   the substrate has two surfaces and edges defining the outer periphery of the substrate;
   the laminate comprises a protective layer; a metallized coating; and a polyester film carrier, the carrier having a top and bottom surface, the bottom surface having been treated with an inert gas to remove impurities therefrom; wherein the protective layer is disposed on the top surface of the carrier, and the metallized coating is deposited on the bottom surface of the carrier for simulating the appearance of a metallized component;
   wherein the support plastic is secured to one surface of the substrate and the metallized coating of the laminate is adhered to the other surface of the substrate by an adhesive layer disposed between the metallized coating and the substrate; and wherein the edges of the substrate to which the laminate is adhered are curled so as to form a curved bend at the outer periphery of the substrate,
   wherein the curled edges of the substrate provide a wear resistant and a weather resistant seal between the carrier and the substrate in that the curled edges protect against the penetration of water or other foreign matter in between the layers of the trim component.

2. The trim component of claim 1, wherein the inert gas is argon gas.

3. The trim component of claim 1, wherein the metallized coating is fabricated with aluminum.

4. The trim component of claim 1, wherein the adhesive layer deposited between the metallized coating and the substrate comprises a tie coat deposited on the metallized coating and an adhesive deposited on the tie coat.

5. The trim component of claim 1, wherein the substrate is selected from the group consisting of acrylic butyl styrene, polyvinyl chloride, polycarbonate, and styrene.

6. The trim component of claim 1, wherein the edges of the support plastic protrude from the support plastic itself, extend over the curled edges of the substrate with the attached laminate, and abut a portion of the protective layer on the top surface of the film carrier.

7. The trim component of claim 1, wherein the protective coating comprises a lacquer coat.

8. A method of making a trim component, the method comprising the steps of:
   providing a polyester film carrier for supporting layers of coatings, the film carrier having a top surface and a bottom surface;
   exposing at least the bottom surface of the film carrier to an inert gas to remove impurities therefrom;
   depositing a metallized coating on the bottom surface of the carrier for simulating the appearance of a metallized component;
   applying an adhesive layer on the metallized coating for securing the metallized coating and film carrier to a substrate, the substrate having first and second surfaces;
   securing the metallized coating and film carrier to the first surface of the substrate, the adhesive layer being disposed between the metallized coating and the substrate;
   configuring the substrate and attached film carrier and metallized coating into a final component shape such that the substrate has edges defining its outer periphery;
   curling the edges of the substrate (and attached film carrier and metallized coating) for providing a wear resistant and weather resistant seal between the carrier and the substrate;
   securing a support plastic to the second surface of the substrate, thereby forming the trim component, wherein the curled edges of the substrate provide a wear resistant and weather resistant seal between the carrier and the substrate in that the curled edges protect against the penetration of water or other foreign matter in between the layers of the trim component; and
   treating the top surface of the film carrier with a protective coating.

9. The method of claim 8 wherein the inert gas is argon gas.

10. The method of claim 8 wherein the metallized coating is aluminum.

11. The method of claim 8, wherein the step of applying the adhesive layer comprises depositing a tie coat on the metallized coating and depositing an adhesive on the tie coat, wherein the tie coat and adhesive are disposed between and adhere the metallized coating and the substrate.

12. The method of claim 8, wherein the substrate is selected from the group consisting of acrylic butyl styrene, polyvinyl chloride, polycarbonate, and styrene.

13. The method of claim 8, wherein the edges of the support plastic protrude from the support plastic itself, extend over the curled edges of the substrate with the attached metallized coating and carrier, and abut a portion of the protective layer on the top surface of the film carrier.

14. The method of claim 8, wherein the step of configuring the substrate into a final component shape is accomplished by means of vacuum forming.

15. The method of claim 8, wherein the step of configuring the substrate into a final component shape is accomplished by means of pressure forming.

16. The method of claim 8 wherein the protective coating comprises a lacquer coat.

17. A trim component comprising a laminate and a support plastic, wherein the laminate comprises a protective layer; a metallized component; and a polyester film carrier, the carrier having a top and bottom surface, the bottom surface having been treated with an inert gas to remove impurities therefrom; wherein the protective layer is disposed on the top surface of the carrier, and the metallized coating is deposited on the bottom surface of the carrier for simulating the appearance of a metallized component;

wherein the support plastic having a predetermined configuration is adhered to the metallized coating of the laminate, an adhesive layer being disposed between the metallized coating and the support plastic, the laminate and support plastic thereby defining the trim component; and wherein the edges at the outer periphery of each of the layers of the laminate are curled in the direction of the support plastic to provide a wear resistant and weather resistant trim component in that the curled edges protect against the penetration of water or other foreign matter in between the layers of the trim component.

18. The trim component of claim 17, wherein the inert gas is argon gas.

19. The trim component of claim 17, wherein the adhesive layer deposited between the metallized coating and the support plastic comprises a tie coat deposited on the metallized coating and an adhesive deposited on the tie coat.

20. The trim component of claim 17, wherein the edges of the support plastic extend over the curled edges of the laminate and abut a portion of the protective layer on the top surface of the film carrier.

21. A method of making a trim component, the method comprising the steps of:

providing a polyester film carrier for supporting layers of coatings, the film carrier having a top surface and a bottom surface;

exposing at least the bottom surface of the film carrier to an inert gas to remove impurities therefrom;

depositing a metallized coating on the bottom surface of the carrier for simulating the appearance of a metallized component;

applying an adhesive layer on the metallized coating for securing the metallized coating and film carrier to a support plastic;

disposing the metallized film carrier in between two injection mold plates, wherein one mold plate contains a mold for receiving plastic to form a support plastic having a predetermined configuration, and wherein the film carrier is so disposed between the mold plates that the adhesive layer of the film carrier faces the mold plate containing the mold;

closing the injection mold plates together, thereby sealing the metallized film inside the plates;

extruding a support plastic into the mold so that the metallized film carrier is adhesively attached to the support plastic; and treating the top surface of the film carrier with a protective coating.

22. The method of claim 21, wherein the inert gas is argon gas.

23. The method of claim 21, wherein the step of applying the adhesive layer between the metallized coating and the support plastic comprises applying a tie coat on the metallized coating and applying an adhesive on the tie coat.

24. A trim component comprising a laminate, a substrate having first and second surfaces, and a support plastic, wherein the laminate comprises a protective layer; a metallized coating; and a polyester film carrier sandwiched between the protective layer and the metallized coating, the film carrier having a top and bottom surface, the bottom surface having been treated in a vacuum chamber with an inert gas to remove impurities therefrom; wherein the protective layer is disposed on the top surface of the carrier; and wherein the metallized coating is deposited on the bottom argon-treated surface of the carrier for simulating the appearance of a metallized component;

wherein an adhesive layer is disposed on the metallized coating of the laminate, the adhesive layer comprising a tie coat and an adhesive, wherein the tie coat is first applied to the metallized coating of the laminate and the adhesive is applied over the tie coat;

wherein the first surface of the substrate is disposed on the adhesive layer and thereby secured to the metallized coating of the laminate; and wherein the second surface of the substrate is secured to the support plastic, thereby defining the trim component.

25. The trim component of claim 24 wherein the insert gas is argon gas, and wherein the support plastic is secured to the second surface of the substrate by injection molding.

* * * * *